Feb. 5, 1935. G. VAN DAAM 1,990,056

WATER HEATER

Filed Aug. 5, 1933

Inventor:
Gerrit Van Daam,
By [signature]
Attorney.

Patented Feb. 5, 1935

1,990,056

UNITED STATES PATENT OFFICE 1,990,056

WATER HEATER

Gerrit Van Daam, Buffalo, N. Y.

Application August 5, 1933, Serial No. 683,821

1 Claim. (Cl. 122—20)

My invention relates to improvements in water heaters. The object is to provide simple and efficient means for utilizing the heat of waste gases or products of combustion by applying the same to a thin film of water of maximum surface area in order to bring the same quickly to high temperature.

The invention comprises means, which may be applied in different ways in connection with the exhaust or smoke flue of heaters, furnaces, steam generators and other types of combustion chambers, and which shall not interfere with the draft in said flue.

The device in accordance with my invention is adapted to be self-containing and may be applied to varying forms of apparatus.

Referring to the drawing which illustrates merely by way of example suitable means for the embodiment of my invention:—

Similar numerals refer to similar parts throughout the several views.

Figure 1:
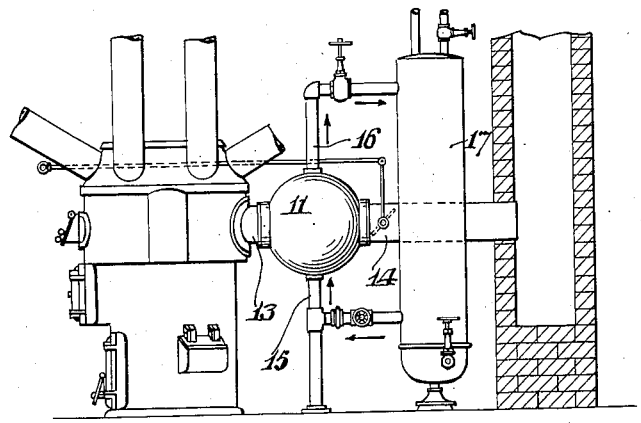
Fig. 1 is a view in elevation showing the general arrangement with furnace and flue.

The invention comprises a substantially spherical chamber-forming structure 11 with two substantially parallel walls 7 and 8 having preferably corresponding corrugations. These walls are closely associated to form between them an extremely thin space 9 of corrugated and generally spherical contour, through which moves the water to be heated, in a very thin film.

The outer corrugated wall 7 is preferably packed with heat insulating material 10, which in turn is preferably covered by a lagging. By packing insulating material in the channel formed in the outer corrugated wall 7, it results that the volume of insulation is greatest and hence most effective where the heat transfer is most intense, that is at the inner ridges of wall 8. The inner corrugated wall 8 forms a substantially spherical chamber 12 of diameter greater than the diameter of the smoke flue 13 delivering thereto and also of the flue 14 leading therefrom.

This chambered formation can of course be built up of few or several sections, depending upon circumstances.

The space 9 between the two spherical, and preferably corrugated, walls 7 and 8 is shown as connected at bottom and top, to water pipes 15 and 16 leading to and from the boiler or container. The spherical chamber may be so constructed as in Figs. 1 and 2 to engage with a horizontal flue.

In operation

Figure 2:
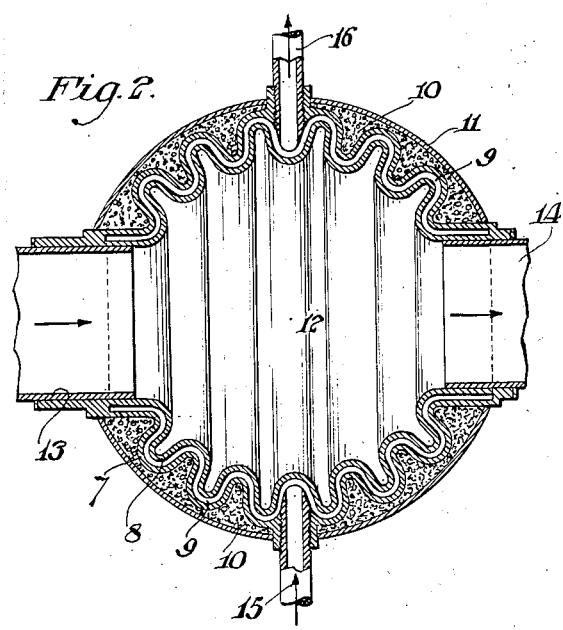
Fig. 2 is a sectional view of the water heating unit on an enlarged scale.

In the arrangement shown in Figs. 1 and 2, for example, the products of combustion enter chamber 12 from the flue section 13 and discharge from said chamber through flue section 14. As the chamber 12 is of greater diameter than that of the inlet and exit flues, the gases have a tendency to expand in the chamber 12, and turbulence results, whereby greater heat is transferred to and through the wall 8 to the film of water between walls 7 and 8. The corrugations of course tend to increase the turbulence and also present a greater surface area to the heat, than were the wall smooth.

The water enters the space between the walls through pipe 15 delivering at the bottom of the spherical formation, and passes upwardly in an extremely thin film, between said walls and delivers through pipe 16 at the top, thus giving a thermic circulation from tank 17 back to said tank.

It will be obvious to any one versed in the art that the very thin film of water must absorb very rapidly the heat delivered to wall by the products of combustion, and thus the thermic circulation will be extremely rapid and effective.

It will also be noted that the chamber 12, being of greater diameter than that the flues will present little, if any, obstruction to the passages of the flue gases therethrough, and there is therefore no obstruction of the draft, and consequently no interference with the efficiency of combustion in the combustion chamber fire-box.

As above stated the device is applicable to any form of furnace, or combustion chamber, especially for steam generators for steam engines either land or marine.

The chamber 12 may be cleaned as required in any convenient and well known way for example, one of the flue pipes may be temporarily removed for this purpose or a clean-out door may be provided in building the unit.

What I claim is:—

A water heater comprising a chambered body formed with two closely adjacent parallel corrugated walls, the inner wall forming a substantially spherical chamber, the space between the parallel walls provided with inlet and outlet water connections in a plane substantially perpendicular to that of the flue inlet and outlet ports, the spherical chamber having inlet and outlet ports for flue connections, said ports being diametrically positioned in a horizontal plane, and of diameter approximately one-half the diameter of the spherical chamber, so that the products delivered to said chamber will expand and cause turbulence and increased heat transfer to the water.

GERRIT VAN DAAM.